(12) United States Patent
Hrebien

(10) Patent No.: US 9,185,400 B2
(45) Date of Patent: Nov. 10, 2015

(54) METHOD AND A SYSTEM FOR DETERMINING A VIDEO FRAME TYPE

(75) Inventor: Maciej Hrebien, Zielona Gora (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 141 days.

(21) Appl. No.: 13/824,427

(22) PCT Filed: Dec. 29, 2011

(86) PCT No.: PCT/EP2011/074198
§ 371 (c)(1),
(2), (4) Date: Mar. 18, 2013

(87) PCT Pub. No.: WO2012/089790
PCT Pub. Date: Jul. 5, 2012

(65) Prior Publication Data
US 2013/0265389 A1    Oct. 10, 2013

(30) Foreign Application Priority Data
Dec. 31, 2010    (EP) .................................. 10016232

(51) Int. Cl.
| H04N 15/00 | (2006.01) |
| H04N 13/00 | (2006.01) |
| G06K 9/00 | (2006.01) |
| G01S 5/02 | (2010.01) |
| H04N 17/00 | (2006.01) |

(52) U.S. Cl.
CPC ........... *H04N 17/00* (2013.01); *H04N 13/0048* (2013.01); *H04N 2213/007* (2013.01)

(58) Field of Classification Search
CPC .............. H04N 13/0048; H04N 17/00; H04N 2213/007
USPC .......................................................... 348/43
See application file for complete search history.

(56) References Cited

U.S. PATENT DOCUMENTS

| 8,624,897 B2* | 1/2014 | Kim et al. ...................... 345/427 |
| 2009/0195774 A1 | 8/2009 | Kawakami |
| 2010/0182404 A1 | 7/2010 | Kuno |
| 2012/0328182 A1* | 12/2012 | Tsukagoshi et al. .......... 382/154 |

FOREIGN PATENT DOCUMENTS

EP    1024672 A1    8/2000

OTHER PUBLICATIONS

Papadimitriou D V et al: "Stereo Disparity Analysis Using Phase Correlation", Electronics Letters, IEE Stevenage, GB, vol. 30, No. 18, (Sep. 1, 1994), pp. 1475-1477, XP006000995, ISSN: 0013-5194, DOI: 10.1049/EL:19941001 p. 1475, Right-Hand col., Line 8; Figures 1-2.

* cited by examiner

*Primary Examiner* — Hee-Yong Kim
(74) *Attorney, Agent, or Firm* — Mark M. Friedman

(57) ABSTRACT

A computer-implemented method for determining a video frame type, comprising the steps of receiving a video frame and analyzing the contents of consecutive lines of the video frame in frequency domain by detecting a number of LR-type lines ($\mu_{LR}$) of the video frame for which the left half of the line is phase-correlated with the right half of the line, detecting an LR mean error ($\epsilon_{LR}$) as a function of the difference between the values of Fourier transform coefficients for the left half of the line and the right half of the line, detecting a number of TB lines ($\mu_{TB}$) of a top half of the frame which are phase-correlated with lines of a bottom half of the frame and detecting a TB mean error ($\epsilon_{TB}$) as a function of the difference between the values of Fourier transform coefficients for the lines of the top half of the frame and the lines of the bottom half of the frame. The method further comprises the step of calculating probability coefficients specifying that the frame type is a TB-type ($p_{TB}$) or LR-type ($p_{LR}$) 3D frame as a function of the LR mean error ($\epsilon_{LR}$) and the TB mean error ($\epsilon_{TB}$) and calculating a probability coefficient specifying that the frame type is a 2D frame as a function of the number of LR-type lines ($\mu_{LR}$) and the number of TB lines ($\mu_{TB}$).

8 Claims, 11 Drawing Sheets

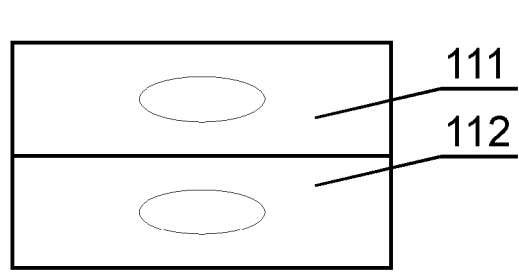
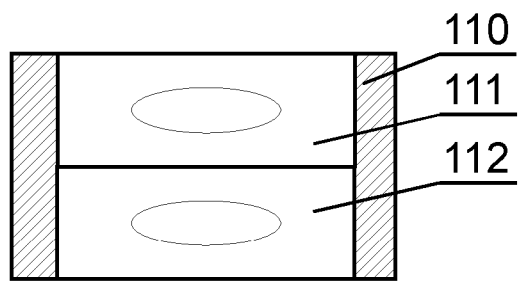
Fig. 3A Fig. 3B
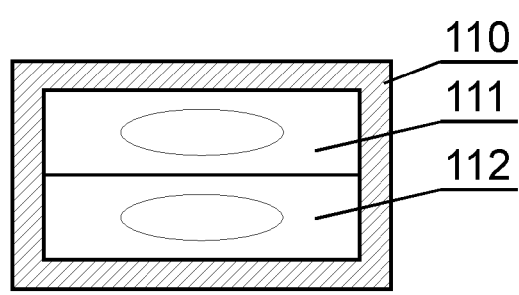
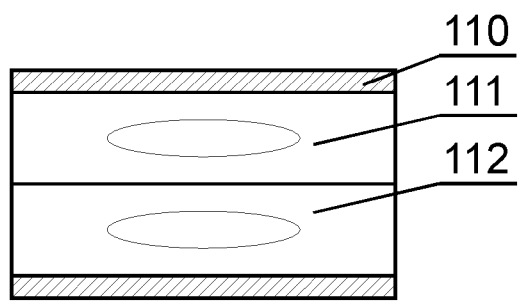
Fig. 3C Fig. 3D
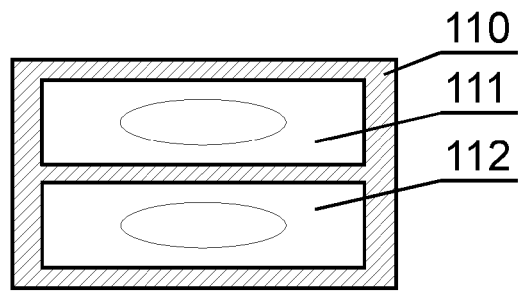
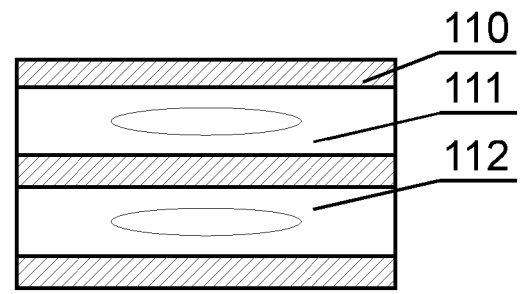
Fig. 3E Fig. 3F
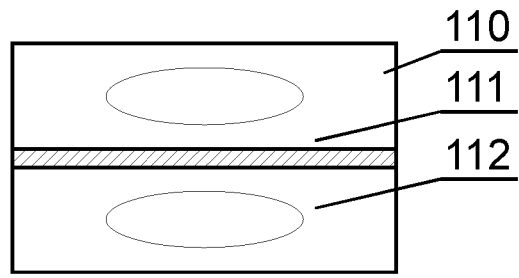
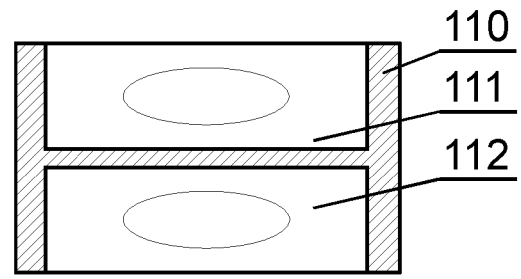
Fig. 3G Fig. 3H

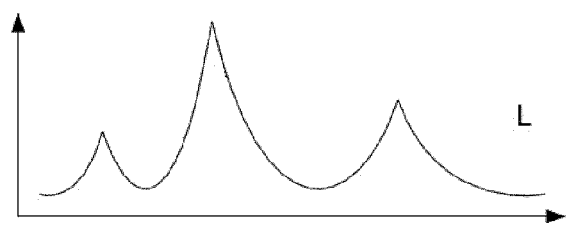
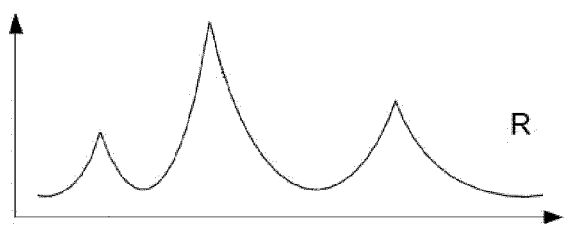
Fig. 8A
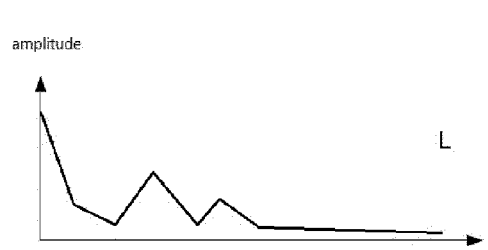
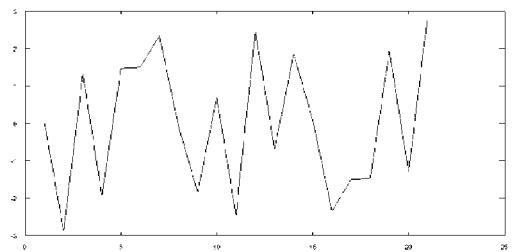
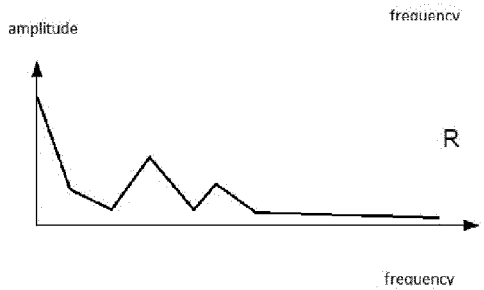
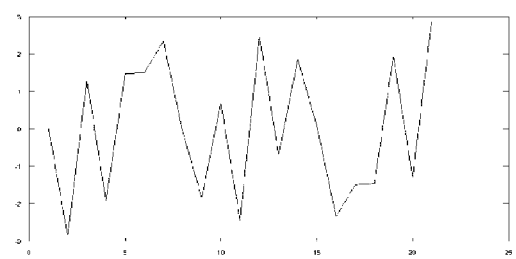
Fig. 9A
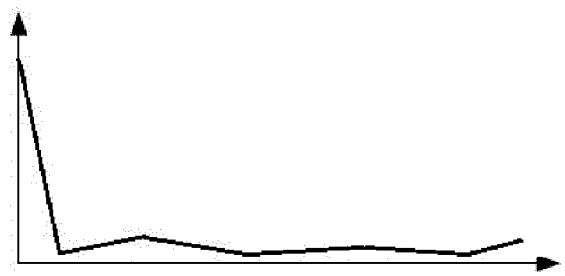
Fig. 10A

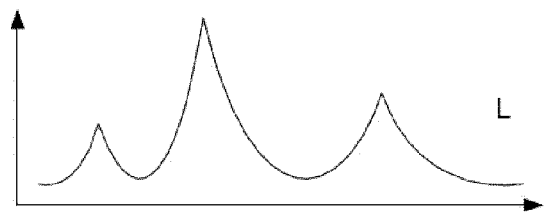
Fig. 8B
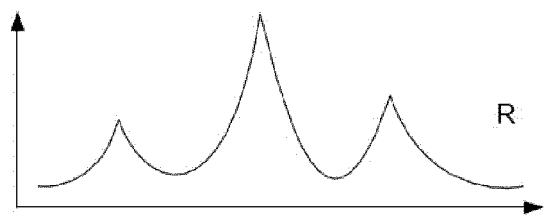
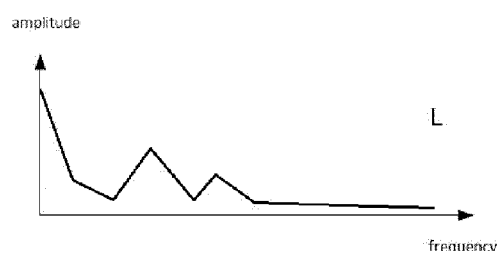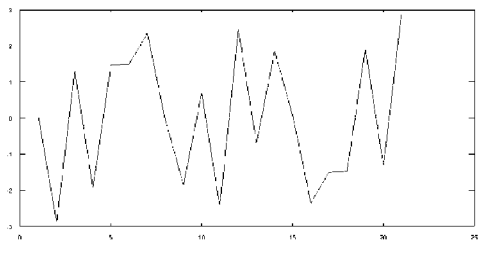
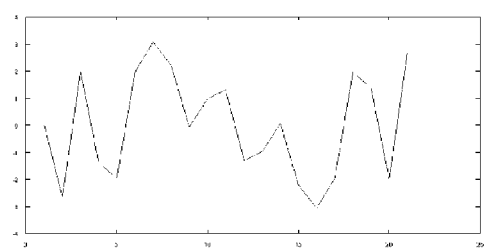
Fig. 9B
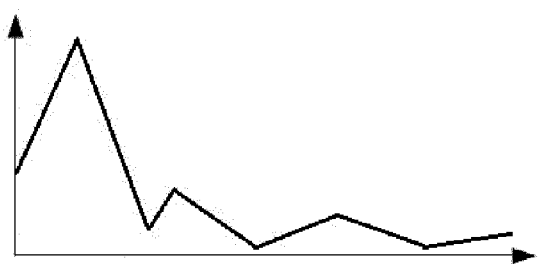
Fig. 10B

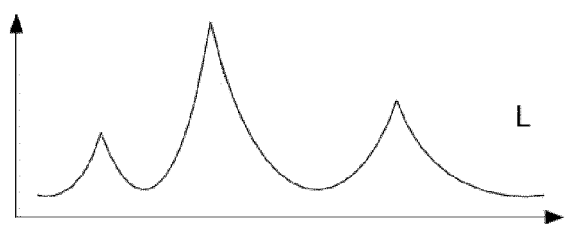
Fig. 8C
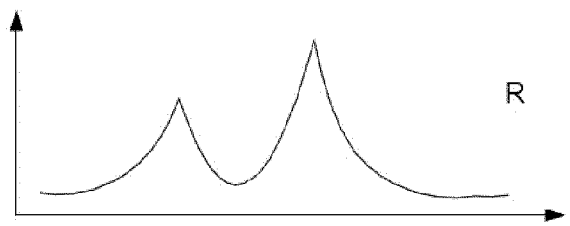
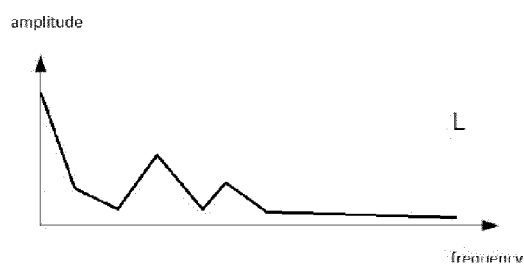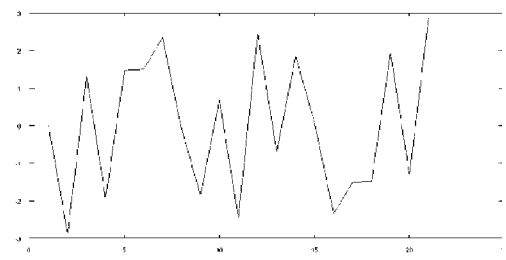
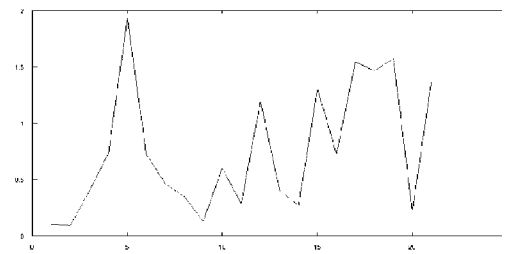
Fig. 9C
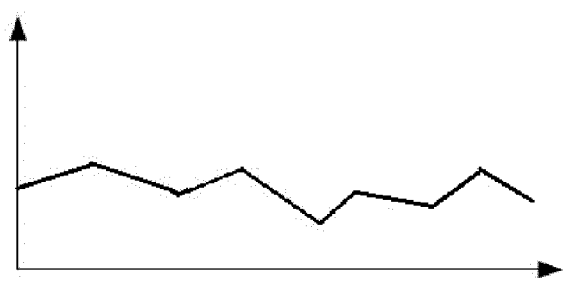
Fig. 10C $\varepsilon_{LR} = \mu_{LR} = \zeta_{LR} = 0$ $\forall$ i-th row of a grayscaled image $A_{m \times n}$:

$F_{0...N} = \text{DFT}\left(\text{shrink}\left(A_{i,\,1...n/2}\right)\right)$
$G_{0...N} = \text{DFT}\left(\text{shrink}\left(A_{i,\,n/2+1...n}\right)\right)$ if $\left(|F_0| > N \text{ and } |G_0| > N\right)$
$\quad p = arg\,max\left(real\left(\text{DFT}^{-1}(F \cdot G^*)\right)\right)$ $\quad$ if $(p > N - N/4 \text{ and } p < N/4)$
$\quad\quad \mu_{LR} = \mu_{LR} + 1$
$\quad$ end
$\quad \varepsilon_{LR} = \varepsilon_{LR} + \dfrac{1}{N}\sqrt{\sum_{i=0}^{N}\left(|F_i| - |G_i|\right)^2}$ else
$\quad \zeta_{LR} = \zeta_{LR} + 1$
end
end

Fig. 11A

$\varepsilon_{TB} = \mu_{TB} = \zeta_{TB} = 0$ for every i-th row $\leq m/2$ of a grayscaled image $A_{m \times n}$:

$F_{0...N} = \text{DFT}\left(\text{shrink}\left(A_{i,\,1...n}\right)\right)$
$G_{0...N} = \text{DFT}\left(\text{shrink}\left(A_{i+m/2,\,1...n}\right)\right)$ if $\left(|F_0| > N \text{ and } |G_0| > N\right)$
$\quad p = arg\,max\left(real\left(\text{DFT}^{-1}(F \cdot G^*)\right)\right)$ $\quad$ if $(p > N - N/4 \text{ and } p < N/4)$
$\quad\quad \mu_{TB} = \mu_{TB} + 1$
$\quad$ end
$\quad \varepsilon_{TB} = \varepsilon_{TB} + \dfrac{1}{N}\sqrt{\sum_{i=0}^{N}\left(|F_i| - |G_i|\right)^2}$ else
$\quad \zeta_{TB} = \zeta_{TB} + 1$
end
end

Fig. 11B

$$p_{LR} = \begin{cases} 1 - \dfrac{\varepsilon_{LR}}{\varepsilon_{LR} + \varepsilon_{TB}}, & \text{for: } \varepsilon_{LR} + \varepsilon_{TB} > 0 \\ 0, & \text{otherwise} \end{cases}$$

$$p_{TB} = \begin{cases} 1 - \dfrac{\varepsilon_{TB}}{\varepsilon_{LR} + \varepsilon_{TB}}, & \text{for: } \varepsilon_{LR} + \varepsilon_{TB} > 0 \\ 0, & \text{otherwise} \end{cases}$$

$$p_{2D} = \begin{cases} 1 - \dfrac{\mu_{LR}}{m - \zeta_{LR}}, & \text{for: } \varepsilon_{LR} < \varepsilon_{TB} \text{ and } \zeta_{LR} < m \\ 1 - \dfrac{\mu_{TB}}{\left(\dfrac{m}{2} - \zeta_{TB}\right)}, & \text{for: } \varepsilon_{LR} \geq \varepsilon_{TB} \text{ and } \zeta_{TB} < \dfrac{m}{2} \\ 0, & \text{otherwise} \end{cases}$$

Fig. 12

METHOD AND A SYSTEM FOR DETERMINING A VIDEO FRAME TYPE

TECHNICAL FIELD

The present invention relates to determining video frame type, in particular distinguishing between a two-dimensional (2D) and three-dimensional (3D) video frames.

BACKGROUND ART

Stereoscopic video displays can be used to display both 2D and 3D video signals, by processing the frames of the signals depending on the type of signal. The type of the signal can be specified manually by the user, which can be troublesome for inexperienced users. The type of signal can be also specified by supplementary data included in the signal itself or by a supplementary signal, which requires the video display unit to be able to decode and recognize the supplementary data or the supplementary signal.

A US patent application US2009/0009508 presents an apparatus and a method for driving a 2D/3D switchable display, which includes an image mode determination unit determining whether input image signals of continuous frames are in a 2D mode or 3D mode. The 3D mode is recognized by determining a syntax indicating a stereo or a multiview image included in the header information of the input image signal. Alternatively, the image mode can be determined based on the presence of a stereo sync signal. Therefore, the mode determination requires data or signals supplementary to the basic image data.

A PCT patent application WO2010/014973 presents a method and an apparatus for encoding or tagging a video frame which provide a way to indicate, to a receiver, whether the video content is 3-D content or 2-D content, by replacing lines of at least one video frame in a 3-D content with a specific color or pattern. Therefore, the method is useful only for receivers, which are able to recognize the specific color or patterns as an indication of a 3-D content.

A US patent application US2010/182404 presents a 3D video reproduction apparatus, system and method, wherein a input video frame type is detected. The detection is performed by carried out by analyzing difference signals, one difference signal indicating the difference between the left and right side of the image and another difference signal indicating the difference between the top and bottom side of the image. If one of the difference signals is lower than a predetermined value, this indicates a particular type of a 3D frame. If both difference signals are higher than a predetermined value, this indicates a 2D frame. Therefore, the 3D and 2D frame type is determined according to the same type of difference signals.

A US patent application US2009/195774 presents an image analyzed, wherein a parallax is calculated the calculation involves phase correlation analysis between image parts. However, the process is not related to detection whether the frame is of a 3D or 2D type.

In an article "Stereo disparity analysis using phase correlation" by Papadimitriou D V et al (Electronic Letters, IEE Stevenage, GB, vol. 30, no. 18, pp. 1475-1477, ISSN: 0013-5194), a method of image processing by phase correlation is described to increase the speed and accuracy of stereo matching.

In case the display lacks the functionality of decoding supplementary data included in the signal or is not able to decode supplementary signals describing the video type, or the video signal contains only basic image contents without the image type indicated, the signal must be recognized in an alternative way.

The aim of the present invention is to provide a method for determining the video frame type by analyzing video signals having no or unknown indication of video frame type.

DISCLOSURE OF THE INVENTION

The object of the invention is a computer-implemented method for determining a video frame type, characterized in that it comprises the steps of receiving a video frame and analyzing the contents of consecutive lines of the video frame in frequency domain by detecting a number of LR-type lines ($\mu_{LR}$) of the video frame for which the left half of the line is phase-correlated with the right half of the line, detecting an LR mean error ($\epsilon_{LR}$) as a function of the difference between the values of Fourier transform coefficients for the left half of the line and the right half of the line, detecting a number of TB lines ($\mu_{TB}$) of a top half of the frame which are phase-correlated with lines of a bottom half of the frame and detecting a TB mean error ($\epsilon_{TB}$) as a function of the difference between the values of Fourier transform coefficients for the lines of the top half of the frame and the lines of the bottom half of the frame. The method further comprises the steps of calculating probability coefficients specifying that the frame type is a TB-type ($p_{TB}$) or LR-type ($p_{LR}$) 3D frame as a function of the LR mean error ($\epsilon_{LR}$) and the TB mean error ($\epsilon_{TB}$) and calculating a probability coefficient specifying that the frame type is a 2D frame as a function of the number of LR-type lines ($\mu_{LR}$) and the number of TB lines ($\mu_{TB}$).

The phase correlation between the left half of the line and the right half of the line can be determined on the basis of a peak coefficient given by the equation:

$$p = \arg\max(\text{real}(\text{DFT}^{-1}(F \cdot G^*)))$$

wherein F, G are the Fourier transforms of the contents of the left half of the line and the right half of the line.

The phase correlation between the lines of the top half of the frame and the lines of a bottom half of the frame can be determined on the basis of a peak coefficient given by the equation:

$$p = \arg\max(\text{real}(\text{DFT}^{-1}(F \cdot G^*)))$$

wherein F, G are the Fourier transforms of the contents of the lines of the top half of the frame and the lines of a bottom half of the frame.

The LR-type lines can be defined as lines for which the peak coefficient is in the first or the last quarter of the total set of coefficients and the TB-type lines can be defined as lines for which the peak coefficient is in the first or the last quarter of the total set of coefficients.

The LR mean error ($\epsilon_{LR}$) can be calculated for consecutive lines as:

$$\varepsilon_{LR} = \varepsilon_{LR} + \frac{1}{N}\sqrt{\sum_{i=0}^{N}|F_i| - |G_i|^2}$$

wherein F, G are the Fourier transforms of the contents of the left half of the line and the right half of the line, N is the total number of Fourier coefficients.

The TB mean error ($\varepsilon_{TB}$) can be calculated for consecutive lines as:

$$\varepsilon_{TB} = \varepsilon_{TB} + \frac{1}{N}\sqrt{\sum_{i=0}^{N}||F_i|-|G_i||^2}$$

wherein F, G are the Fourier transforms of the contents of the lines of the top half of the frame and the lines of a bottom half of the frame, N is the total number of Fourier coefficients.

The probability coefficients can be calculated as:

$$p_{LR} = \begin{cases} 1 - \dfrac{\varepsilon_{LR}}{\varepsilon_{LR}+\varepsilon_{TB}}, & \text{for: } \varepsilon_{LR}+\varepsilon_{TB} > 0 \\ 0, & \text{otherwise} \end{cases}$$

$$p_{TB} = \begin{cases} 1 - \dfrac{\varepsilon_{TB}}{\varepsilon_{LR}+\varepsilon_{TB}}, & \text{for: } \varepsilon_{lR}+\varepsilon_{TB} > 0 \\ 0, & \text{otherwise} \end{cases}$$

$$p_{2D} = \begin{cases} 1 - \dfrac{\mu_{LR}}{m-\zeta_{LR}}, & \text{for: } \varepsilon_{LR} < \varepsilon_{TB} \text{ and } \zeta_{LR} < m \\ 1 - \dfrac{\mu_{TB}}{\left(\frac{m}{2}-\zeta_{TB}\right)}, & \text{for: } \varepsilon_{LR} \geq \varepsilon_{TB} \text{ and } \zeta_{TB} < \dfrac{m}{2} \\ 0, & \text{otherwise} \end{cases}$$

The object of the invention is also a computer program comprising program code means for performing all the steps of the computer-implemented method according to the invention when said program is run on a computer, as well as a computer readable medium storing computer-executable instructions performing all the steps of the computer-implemented method according to the invention when executed on a computer.

Another object of the invention is a system for determining a video frame type, which comprises a frame reader configured to receive a video frame. It further comprises an LR type detector configured to analyze the contents of consecutive lines of the video frame in frequency domain by detecting a number of LR-type lines ($\mu_{LR}$) of the video frame for which the left half of the line is phase-correlated with the right half of the line and detecting an LR mean error ($\varepsilon_{LR}$) as a function of the difference between the values of Fourier transform coefficients for the left half of the line and the right half of the line. A TB type detector is configured to analyze the contents of consecutive lines of the video frame in frequency domain by detecting a number of TB lines ($\mu_{TB}$) of a top half of the frame which are phase-correlated with lines of a bottom half of the frame and detecting a TB mean error ($\varepsilon_{TB}$) as a function of the difference between the values of Fourier transform coefficients for the lines of the top half of the frame and the lines of the bottom half of the frame. A probability calculator is configured to calculate probability coefficients specifying that the frame type is a TB-type ($p_{TB}$) or LR-type ($p_{LR}$) 3D frame as a function of the LR mean error ($\varepsilon_{LR}$) and the TB mean error ($\varepsilon_{TB}$) and calculate a probability coefficient specifying that the frame type is a 2D frame as a function of the number of LR-type lines ($\mu_{LR}$) and the number of TB lines ($\mu_{TB}$).

BRIEF DESCRIPTION OF DRAWINGS

The present invention will be shown by means of an exemplary embodiment on a drawing, in which:

FIGS. 3A-3H show examples of typical 3D video frames of a Top-Bottom (TB) type.

FIGS. 8A-8C show plots of values of pixels of exemplary left and right halves of lines of different types of images.

FIGS. 9A-9C show Fourier coefficients related to plots of FIG. 8A-8C.

FIGS. 10A-10C show plots to determine phase correlation, related to plots of FIG. 8A-8C.

FIGS. 11A-11B show algorithms for processing the left and right half of the frame and the top and bottom half of the frame, respectively.

FIG. 12 shows equations for calculating probability coefficients.

MODES FOR CARRYING OUT THE INVENTION

Figure 1A:
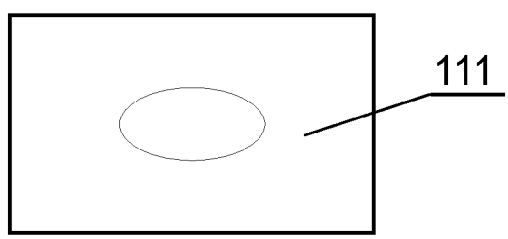
FIGS. 1A-1D show examples of typical 2D video frames.
Figure 1B:
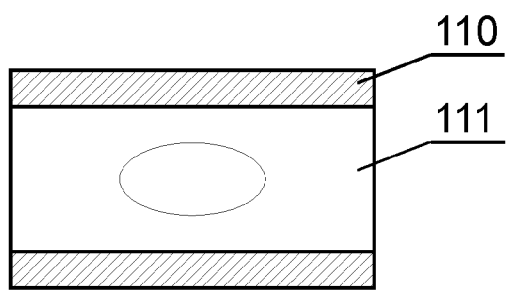
Figure 1C:
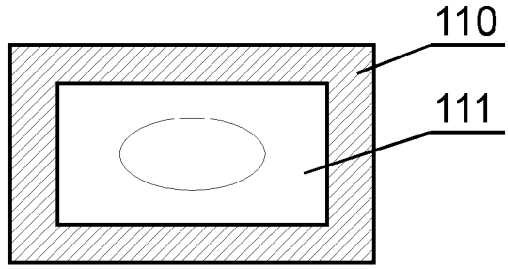
Figure 1D:
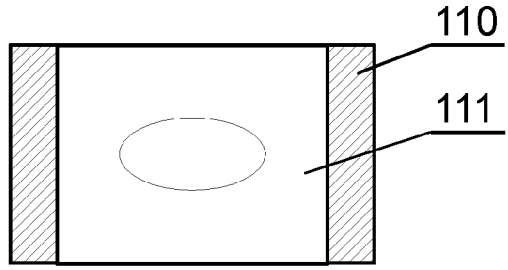

FIGS. 1A-1D show examples of typical 2D video frames. The frame may comprise only an active image region 111 as shown in FIG. 1A. Alternatively, the 2D frame may further comprise a non-active image region 110, such as bars of a uniform color, e.g. black, at the top and bottom edges of the frame as shown in FIG. 1B or bars at the top, bottom, left and right edges of the frame as shown in FIG. 1C or bars at the left and right edges of the frame as shown in FIG. 1D.

Figure 2A:
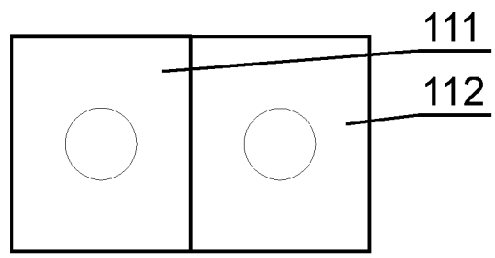
FIGS. 2A-2H show examples of typical 3D video frames of an Left-Right (LR) type.
Figure 2B:
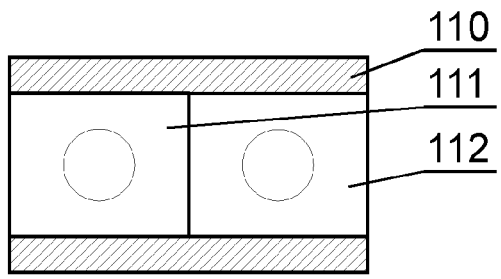
Figure 2C:
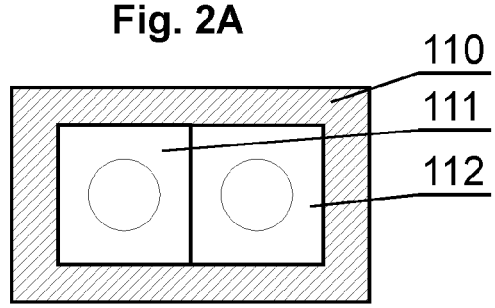
Figure 2D:
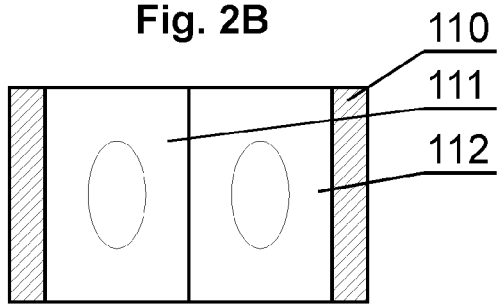
Figure 2E:
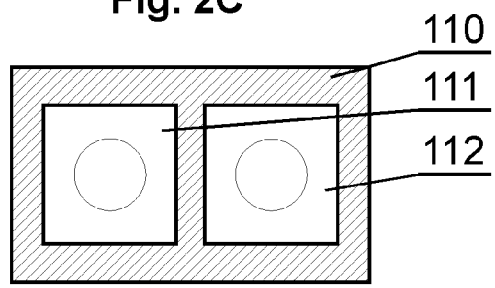
Figure 2F:
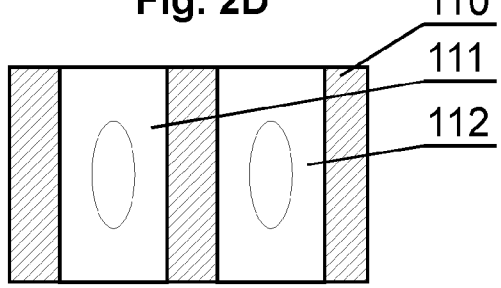
Figure 2G:
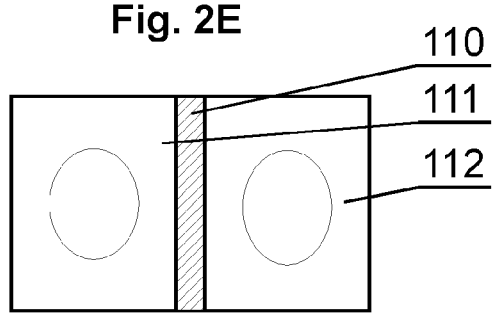
Figure 2H:
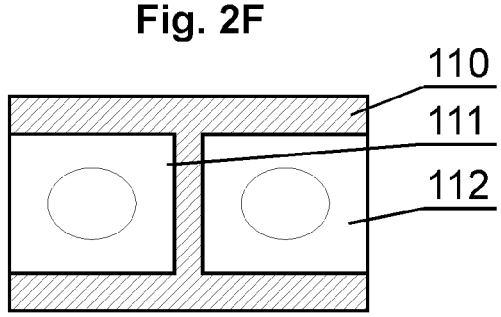

FIGS. 2A-2H show examples of typical 3D video frames of a Left-Right (LR) type. Such frame, as shown in FIG. 2A, comprises two active image regions 111, 112, which define the content to be displayed for the left and right eye. The active regions 111, 112 may be scaled-down in the horizontal direction in order to fit into dimensions of a standardized 2D frame. A 3D frame may also contain non-active image regions 110, such as bars of a uniform color, e.g. black, at the top and bottom edges of the frame as shown in FIG. 2B, at the top, bottom, left and right edges of the frame as shown in FIG. 2C, at the left and right edges of the frame as shown in FIG. 2D, at the top, bottom, left and right edges of the frame and between the active regions as shown in FIG. 2E, at the left and right edges of the frame and between the active regions as shown in FIG. 2F, between the active regions as shown in FIG. 2G or at the top and bottom edges of the frame and between the active regions as shown in FIG. 2H.

FIGS. 3A-3H show examples of typical 3D video frames of a Top-Bottom (TB) type. Such frame, as shown in FIG. 3A, comprises two active image regions 111, 112, which define the content to be displayed for the left (e.g. the top region) and the right (e.g. the bottom region) eye. The active regions 111, 112 may be scaled-down in the vertical direction in order to fit into dimensions of a standard 2D frame. A 3D frame may also contain non-active image regions 110, such as: bars of a uniform color, e.g. black, at the left and right edges of the frame as shown in FIG. 3B, at the top, bottom, left and right edges of the frame as shown in FIG. 3C, at the top and bottom edges of the frame as shown in FIG. 3D, at the top, bottom, left and right edges of the frame and between the active regions as shown in FIG. 3E, at the top and bottom edges of the frame and between the active regions as shown in FIG. 3F, between the active regions as shown in FIG. 3G or at the left and right edges of the frame and between the active regions as shown in FIG. 3H.

Figure 4:
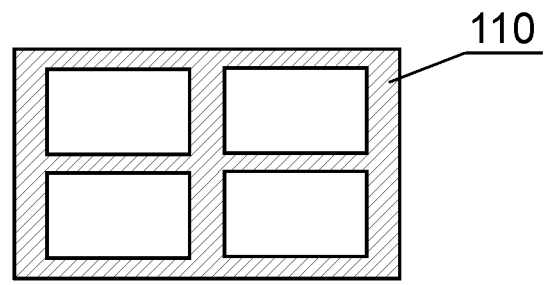
FIG. 4 shows the common non-active image regions of a video frame.

Therefore, for any 2D or 3D video frame, the most probable non-active regions 110 may form bars at the top, bottom, left, right, horizontal centre and vertical centre of the frame, as shown in FIG. 4.

Figure 5:
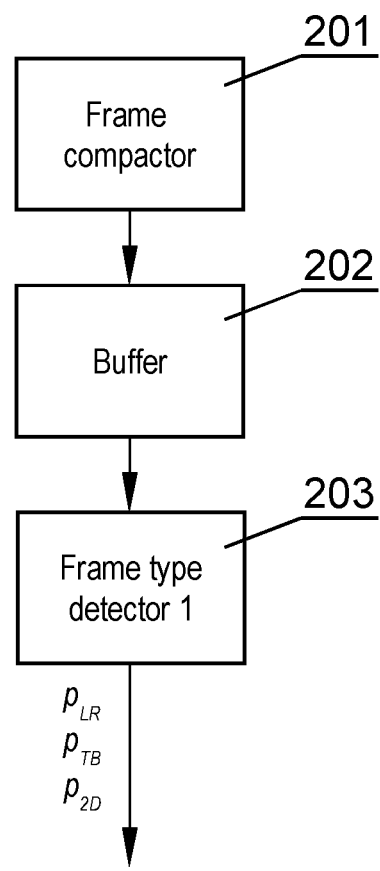
FIG. 5 shows the structure of a system for determining video frame type.

FIG. 5 shows the structure of a system for determining video frame type according to the invention. The system comprises a frame compactor 201 configured to extract from the input video frames data representing an active region and discard the data representing the non-active region of the frame, according to the procedure shown in FIG. 6, and possibly to reduce the amount of data by scaling-down and/or discarding the color information. The reduced frame representation is passed to a buffer 202, from which it is collected by a frame type detector 203 operating according to the procedure shown in FIG. 7 The frame type detector 203 provides an output in form of coefficients p, indicative of a probability that the frame is a 2D ($p_{2D}$) or a 3D frame, wherein for 3D frames the detector may indicate the type of frame: an LR frame ($p_{LR}$) or a TB frame ($p_{TB}$).

Figure 6:
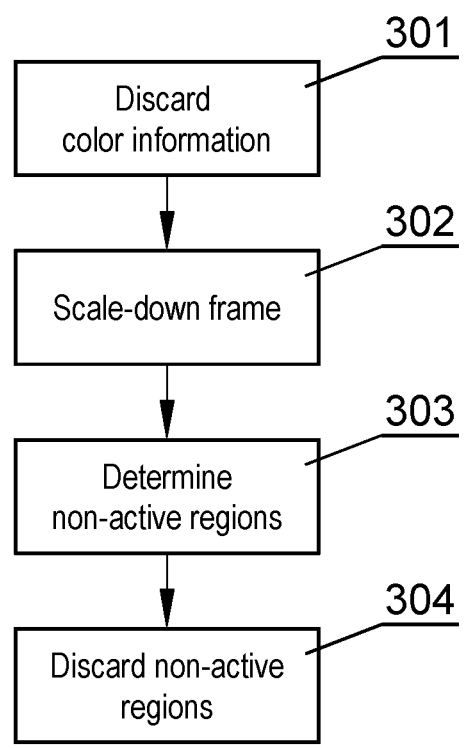
FIG. 6 shows the procedure of operation of a frame compactor.

FIG. 6 shows the procedure of operation of the frame compactor 201. In step 301, the received input frame may be reduced for easier analysis, by scaling it down, i.e. reducing the size of the frame. Next, in step 302 the color information can be discarded, either by converting the frame contents into a grayscale or selecting contents of only one color channel. Next, in step 303 the frame is analyzed to detect the non-active regions, preferably in areas indicated in FIG. 4, namely in the bars located at the top, bottom, left, right, horizontal centre and vertical centre of the frame. The contents of the detected non-active regions are discarded in step 304 so as to generate a frame containing only data of active regions, as shown in FIG. 1A, 2A or 3A. The processing of a frame by the frame compactor 201 may be initiated after a change of the video input signal, for example a change of a channel in a television decoder, in order to determine the type of the new signal. Alternatively, the frame compactor 201 may be operated continuously, in order to detect change of type of the received signal, for example to detect a 2D commercial break in a 3D video film. In such a case, the frame compactor 201 may receive the frames with a specific frequency, preferably lower than the frame display rate, such as 2 frames per second, in order to minimize the computational load of the signal receiver.

Figure 7:
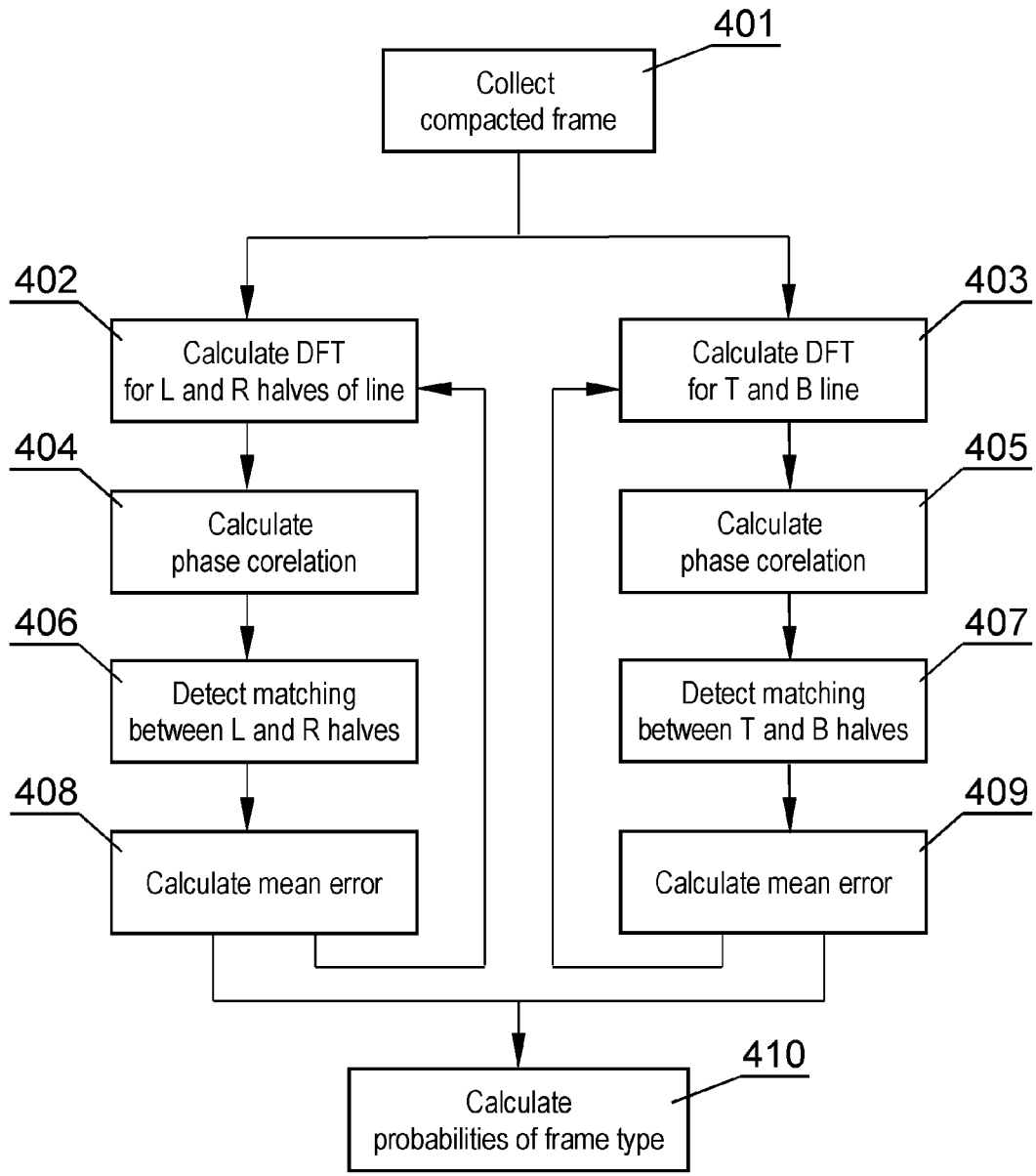
FIG. 7 shows the procedure of operation of a frame type detector.

FIG. 7 shows the procedure of operation of the frame type detector 203. A compacted frame is collected from the buffer 202 in step 401. Next, the frame is processed in two parallel or subsequent sequences of steps, one for detecting whether the frame is of a LR type and the other for detecting whether the frame is of a TB type. In step 402 the frame is divided into lines and the lines are processed consecutively by comparing a left half of the line with a right half of the line. First, a Fourier transform, such as a Discrete Fourier Transform (DFT) or a Fast Fourier Transform (FFT) is calculated for the L and R half of the first line. Similarly, in step 403 the frame is divided into a top and bottom halves and the lines of the halves are processed consecutively by comparing a line of the top half with a line of the bottom half. First, a Fourier transform, such as a Discrete Fourier Transform (DFT) or a Fast Fourier Transform (FFT) is calculated for the first line of the top half and for the first line of the bottom half. In order to simplify computational processing, the lines can be compressed (shrinked) to a size equal to a power of 2, according to the equation:

$$\text{shrink}(u): v_i = u_{[[si]]}$$

$$s = n/\text{align}(n)$$

$$\text{align}(n) = 2^k$$

wherein k is the maximal integer value for which $2^k \le n$ and [[a]] is the integer part of the a value Therefore, the Fourier transforms of the left and right halves of the line to be processed are given by equations:

$$F_{0...N} = DFT(\text{shrink}(A_{i,1...n/2}))$$

$$G_{0...N} = DFT\left(\text{shrink}\left(A_{i,\frac{n}{2}+1...n}\right)\right)$$

wherein i designates a particular line, n is the number of pixels in a line and N is the number of complex numbers.

Similarly, the Fourier transforms of the lines of the top and bottom half of the frame are given by equations:

$$F_{0...N} = DFT(\text{shrink}(A_{i,1...n}))$$

$$G_{0...N} = DFT(\text{shrink}(A_{i+m/2,1...n}))$$

wherein i designates a particular line, m is the number of lines in the frame, n is the number of pixels in a line and N is the number of Fourier coefficients.

FIG. 8A presents a plot of values of pixels of an exemplary left and right half of a line of an LR-type image, wherein the L and R halves are the same, i.e. in phase. FIG. 8B presents a plot of values of pixels of an exemplary left and right half of a line of an LR-type image, which are slightly phase-shifted. FIG. 8C presents a plot of values of pixels of an exemplary left and right half of a line of a mono image, which contain unrelated data.

FIGS. 9A-9C presents corresponding amplitudes and phases of $F_{0...N}$ and $G_{0...N}$ Fourier coefficients for the images of FIGS. 8A-8C.

Next, in steps 404, 405 a phase correlation between $F_{0...N}$ and $G_{0...N}$ is calculated by determining the position of a peak coefficient of a real value of an inverse Fourier transform of a multiple of F and a complex conjugate of G, according to the equation:

$$p = \arg\max(\text{real}(DFT^{-1}(F \cdot G^*)))$$

In order to discard empty lines, the above step may be performed only for non-empty lines, for which the DC coefficient is larger than the number of all coefficients, i.e. the average value of each coefficient is at least 1, as given by a condition:

if ($|F_0| > N$ and $|G_0| > N$)

The number of discarded lines is counted as $\zeta_{LR}$ and $\zeta_{TB}$.

FIGS. 10A-10C present exemplary plots of $(\text{real}(DFT^{-1}(F \cdot G^*)))$ for the lines presented in FIGS. 8A-8C.

Next, in steps 406, 407 it is determined whether there is a phase correlation between the two analyzed lines, by detecting whether the peak coefficient is in the first or the last quarter of the total set of coefficients, according to a condition:

if ($p > N - N/4$ and $p < N/4$)

The quarter (4) has been selected experimentally as a best match to detect coefficients, but other ranges are possible as well.

The algorithm may count the number of matched lines as $\mu_{LR}$ for LR-type lines and $\mu_{TB}$ for TB-type lines.

Next, in steps 408, 409 the mean error is calculated as:

$$\varepsilon_{LR} = \varepsilon_{LR} + \frac{1}{N}\sqrt{\sum_{i=0}^{N}||F_i|-|G_i||^2}$$

$$\varepsilon_{TB} = \varepsilon_{TB} + \frac{1}{N}\sqrt{\sum_{i=0}^{n}||F_i|-|G_i||^2}$$

The mean error is zero if F=G, i.e. the compared lines are the same, as in case of FIG. 8A. The mean error is small, if the compared lines are similar, but shifted in phase, as in case of FIG. 8B. The mean error is large, if the compared lines are different, as in case of FIG. 9B.

The calculations are performed for all lines of the frame.

The steps 402-409 of the method of FIG. 7 have been summarized as a pseudocode on FIG. 11A for LR-type detection and on FIG. 11B for TB-type detection.

Finally, in step 410 the probabilities of frame type are calculated according to the equations shown in FIG. 12.

The probability that the frame is of a LR-type ($p_{LR}$) or a TB-type ($p_{TB}$) is calculated on the basis of the mean errors $\epsilon_{LR}$ and $\epsilon_{TB}$. The probabilities sum up to 1.

The probability that the frame is a 2D-type frame is calculated on the basis of the number of matched lines.

If the value of one of the coefficients $p_{LR}$ or $p_{TB}$ is much higher than the value of the other coefficient, this indicates that the frame is a 3D frame of LR or TB type. If the values of the coefficients $p_{LR}$ and $p_{TB}$ do not differ much from each other, this indicates that the frame is a 2D frame and the probability is best estimated by $p_{2D}$ coefficient.

Figure 13:
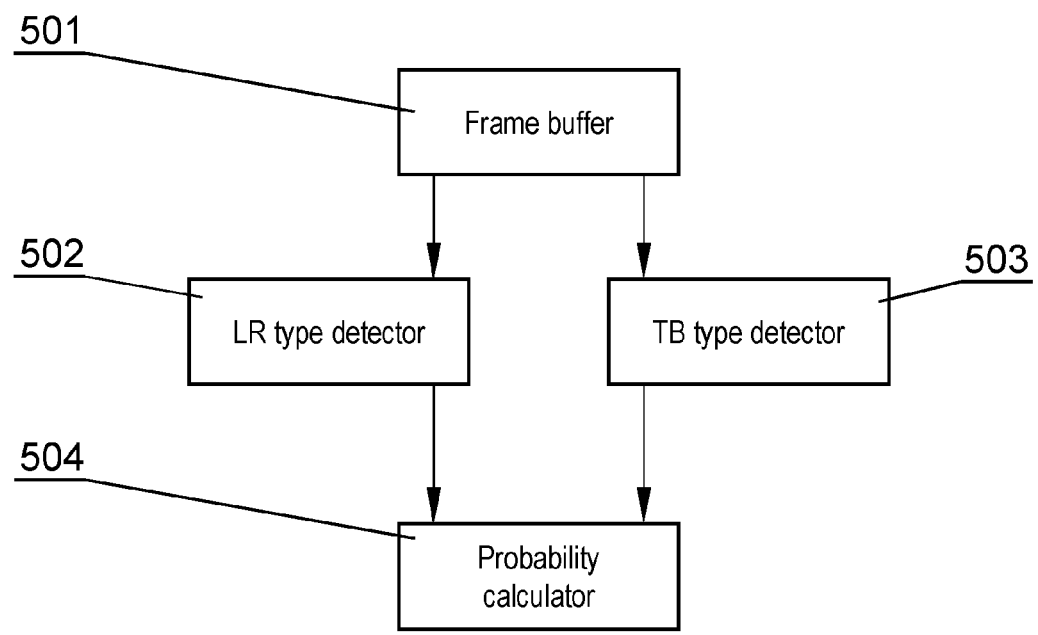
FIG. 13 shows the structure of the frame type detector.

FIG. 13 presents a structure of the frame type detector according to the invention. It comprises a frame reader 501 configured to receive a video frame. The video frame is input to an LR type detector 502 configured to analyze the contents of consecutive lines of the video frame in frequency domain according to steps 402, 404, 406, 408 of the method of FIG. 7, by detecting a number of LR-type lines ($\mu_{LR}$) of the video frame for which the left half of the line is phase-correlated with the right half of the line and detecting an LR mean error ($\epsilon_{LR}$) as a function of the difference between the values of Fourier transform coefficients for the left half of the line and the right half of the line. The video frame is also input to a TB type detector 503 configured to analyze the contents of consecutive lines of the video frame in frequency domain according to steps 403, 405, 407, 409 of the method of FIG. 7 by detecting a number of TB lines ($\mu_{TB}$) of a top half of the frame which are phase-correlated with lines of a bottom half of the frame, detecting a TB mean error ($\epsilon_{TB}$) as a function of the difference between the values of Fourier transform coefficients for the lines of the top half of the frame and the lines of the bottom half of the frame. A probability calculator 504 receives the outputs of the detectors 502, 503 and is configured to calculate probability coefficients specifying that the frame type is a TB-type ($p_{TB}$) or LR-type ($p_{LR}$) 3D frame as a function of the LR mean error ($\epsilon_{LR}$) and the TB mean error ($\epsilon_{TB}$) and calculate a probability coefficient specifying that the frame type is a 2D frame as a function of the number of LR-type lines ($\mu_{LR}$) and the number of TB lines ($\mu_{TB}$), according to step 410 of the method of FIG. 7.

The frame type detector 203 can form a part of a multi-component system, in which a plurality of different frame type detectors are used, each configured to analyze the frame using a different algorithm configured to output a type coefficient indicative of a probability that the frame is of a 2D or 3D type, wherein the type coefficients from the frame type detectors are received by a controller configured to generate a predicted frame type indicator based on the received type coefficients.

In case the system according to the invention is embedded in a video display unit, the determined frame type can be used to select the method of processing the signal to be displayed. In case the system according to the invention is embedded in a video decoder, such as a television set-top box, the determined frame type can be used to select the method of processing the signal to be passed to a display unit, for example converting a 2D signal to a 3D format in case the display unit is set to receive 3D video signals.

It can be easily recognized, by one skilled in the art, that the aforementioned system and method for determining video frame type may be performed and/or controlled by one or more computer programs. Such computer programs are typically executed by utilizing the computing resources of a processing unit which can be embedded within various video signal receivers, such as personal computers, personal digital assistants, cellular telephones, receivers and decoders of digital television, video display units or the like. The computer programs can be stored in a non-volatile memory, for example a flash memory or in a volatile memory, for example RAM and are executed by the processing unit. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein. Accordingly, the scope of protection is not limited to the preferred embodiments described in the specification, but is only limited by the claims that follow.

The invention claimed is:

1. A computer-implemented method for determining a video frame type, characterized in that it comprises the steps of:

receiving a video frame, analyzing the contents of consecutive lines of the video frame in frequency domain by:

detecting a number of LR-type lines ($\mu_{LR}$) of the video frame for which the left half of the line is phase-correlated with the right half of the line, detecting an LR mean error ($\epsilon_{LR}$) as a function of the difference between the values of Fourier transform coefficients for the left half of the line and the right half of the line, detecting a number of TB lines ($\mu_{TB}$) of a top half of the frame which are phase-correlated with lines of a bottom half of the frame, detecting a TB mean error ($\epsilon_{TB}$) as a function of the difference between the values of Fourier transform coefficients for the lines of the top half of the frame and the lines of the bottom half of the frame, calculating probability coefficients specifying that the frame type is a TB-type ($p_{TB}$) or LR-type ($p_{LR}$) 3D frame as a function of the LR mean error ($\epsilon_{LR}$) and the TB mean error ($\epsilon_{TB}$), calculating a probability coefficient specifying that the frame type is a 2D frame as a function of the number of LR-type lines ($\mu_{LR}$) and the number of TB lines ($\mu_{TB}$).

2. The method according to claim 1, wherein the phase correlation between the left half of the line and the right half of the line is determined on the basis of a peak coefficient given by the equation:

$$p = \arg\max(\mathrm{real}(\mathrm{DFT}^{-1}(F \cdot G^*)))$$

wherein F, G are the Fourier transforms of the contents of the left half of the line and the right half of the line.

3. The method according to claim 1, wherein the phase correlation between the lines of the top half of the frame and the lines of a bottom half of the frame is determined on the basis of a peak coefficient given by the equation:

$$p = \arg\max(\mathrm{real}(\mathrm{DFT}^{-1}(F \cdot G^*)))$$

wherein F, G are the Fourier transforms of the contents of the lines of the top half of the frame and the lines of a bottom half of the frame.

4. The method according to claim 2, wherein the LR-type lines are defined as lines for which the peak coefficient is in the first or the last quarter of the total set of coefficients and wherein the TB-type lines are defined as lines for which the peak coefficient is in the first or the last quarter of the total set of coefficients.

5. The method according to claim 1, wherein:
the LR mean error ($\epsilon_{LR}$) is calculated for consecutive lines as:

$$\varepsilon_{LR} = \varepsilon_{LR} + \frac{1}{N}\sqrt{\sum_{i=0}^{N}|F_i|-|G_i|^2}$$

wherein F, G are the Fourier transforms of the contents of the left half of the line and the right half of the line, N is the total number of Fourier coefficients, the TB mean error ($\epsilon_{TB}$) is calculated for consecutive lines as:

$$\varepsilon_{TB} = \varepsilon_{TB} + \frac{1}{N}\sqrt{\sum_{i=0}^{N}|F_i|-|G_i|^2}$$

wherein F, G are the Fourier transforms of the contents of the lines of the top half of the frame and the lines of a bottom half of the frame, N is the total number of Fourier coefficients.

6. The method according to claim 1, wherein the probability coefficients are calculated as:

$$p_{LR} = \begin{cases} 1 - \dfrac{\varepsilon_{LR}}{\varepsilon_{LR}+\varepsilon_{TB}}, & \text{for: } \varepsilon_{LR}+\varepsilon_{TB} > 0 \\ 0, & \text{otherwise} \end{cases}$$

$$p_{TB} = \begin{cases} 1 - \dfrac{\varepsilon_{TB}}{\varepsilon_{LR}+\varepsilon_{TB}}, & \text{for: } \varepsilon_{lR}+\varepsilon_{TB} > 0 \\ 0, & \text{otherwise} \end{cases}$$

$$p_{2D} = \begin{cases} 1 - \dfrac{\mu_{LR}}{m-\zeta_{LR}}, & \text{for: } \varepsilon_{LR} < \varepsilon_{TB} \text{ and } \zeta_{LR} < m \\ 1 - \dfrac{\mu_{TB}}{\left(\frac{m}{2}-\zeta_{TB}\right)}, & \text{for: } \varepsilon_{LR} \geq \varepsilon_{TB} \text{ and } \zeta_{TB} < \dfrac{m}{2} \\ 0, & \text{otherwise} \end{cases}$$

7. A non-transitory computer readable medium storing computer-executable instructions for:
receiving a video frame,
analyzing the contents of consecutive lines of the video frame in frequency domain by:
detecting a number of LR-type lines ($\mu_{LR}$) of the video frame for which the left half of the line is phase-correlated with the right half of the line,
detecting an LR mean error ($\epsilon_{LR}$) as a function of the difference between the values of Fourier transform coefficients for the left half of the line and the right half of the line,
detecting a number of TB lines ($\mu_{TB}$) of a top half of the frame which are phase-correlated with lines of a bottom half of the frame,
detecting a TB mean error ($\epsilon_{TB}$) as a function of the difference between the values of Fourier transform coefficients for the lines of the top half of the frame and the lines of the bottom half of the frame,
calculating probability coefficients specifying that the frame type is a TB-type ($p_{TB}$) or LR-type ($p_{LR}$) 3D frame as a function of the LR mean error ($\epsilon_{LR}$) and the TB mean error ($\epsilon_{TB}$),
calculating a probability coefficient specifying that the frame type is a 2D frame as a function of the number of LR-type lines ($\mu_{LR}$) and the number of TB lines ($\mu_{TB}$).

8. A system for determining a video frame type, characterized in that it comprises:
a frame reader (501) configured to receive a video frame,
an LR type detector (502) configured to analyze the contents of consecutive lines of the video frame in frequency domain by:
detecting a number of LR-type lines ($\mu_{LR}$) of the video frame for which the left half of the line is phase-correlated with the right half of the line,
detecting an LR mean error ($\epsilon_{LR}$) as a function of the difference between the values of Fourier transform coefficients for the left half of the line and the right half of the line,
a TB type detector (503) configured to analyze the contents of consecutive lines of the video frame in frequency domain by:
detecting a number of TB lines ($\mu_{TB}$) of a top half of the frame which are phase-correlated with lines of a bottom half of the frame,
detecting a TB mean error ($\epsilon_{TB}$) as a function of the difference between the values of Fourier transform coefficients for the lines of the top half of the frame and the lines of the bottom half of the frame,
a probability calculator (504) configured to
calculate probability coefficients specifying that the frame type is a TB-type ($p_{TB}$) or LR-type ($p_{LR}$) 3D frame as a function of the LR mean error ($\epsilon_{LR}$) and the TB mean error ($\epsilon_{TB}$)
calculate a probability coefficient specifying that the frame type is a 2D frame as a function of the number of LR-type lines ($\mu_{LR}$) and the number of TB lines ($\mu_{TB}$).

* * * * *